Dec. 8, 1931. E. E. GREVE 1,835,565
REVERSE CLUTCH PULLEY MECHANISM
Filed Dec. 24, 1925
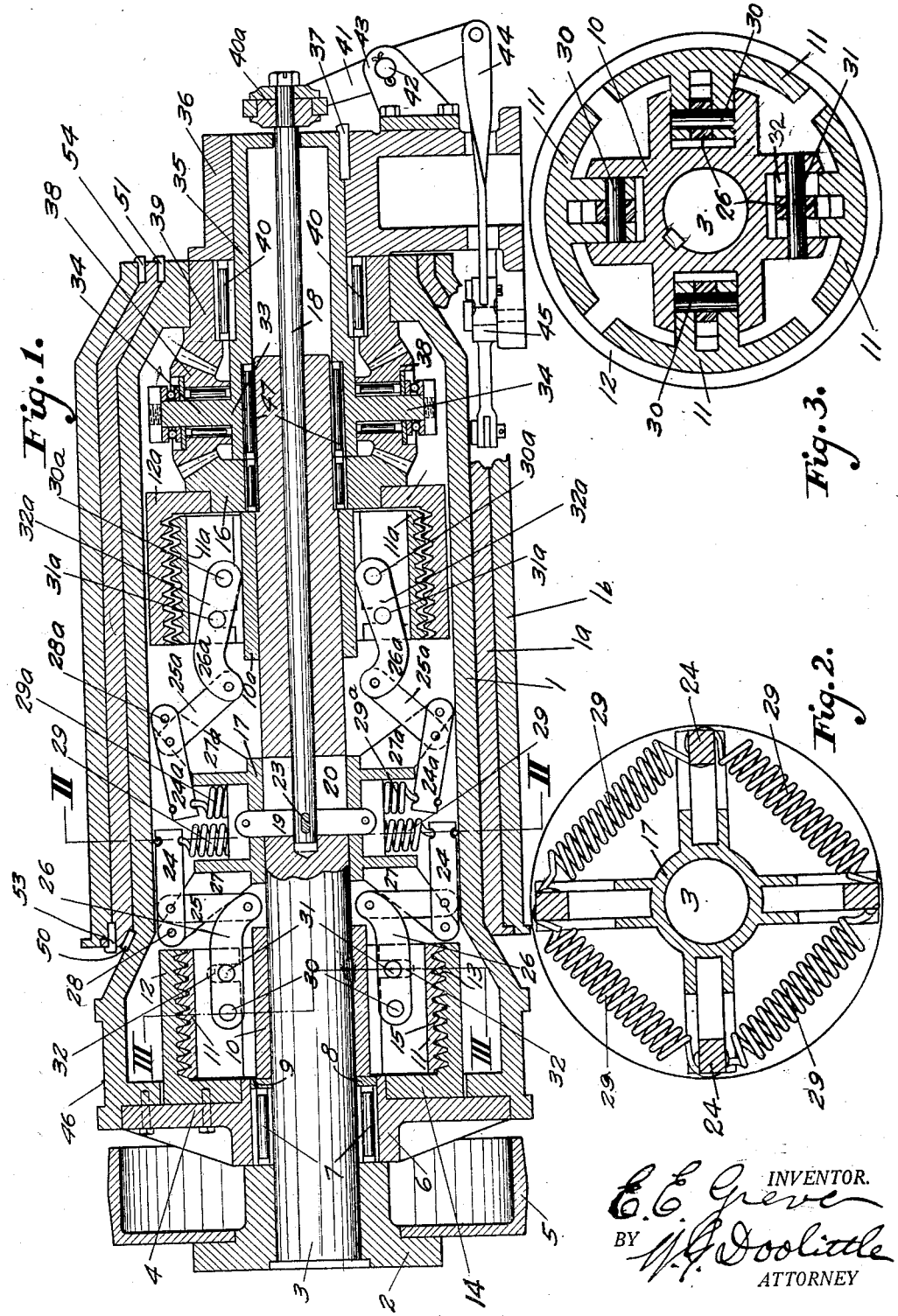
INVENTOR.
E. E. Greve
BY W. G. Doolittle
ATTORNEY Patented Dec. 8, 1931

1,835,565

UNITED STATES PATENT OFFICE

EDGAR E. GREVE, OF BELLEVUE, PENNSYLVANIA, ASSIGNOR, BY MESNE ASSIGNMENTS, TO OIL WELL SUPPLY COMPANY, OF PITTSBURGH, PENNSYLVANIA, A CORPORATION OF NEW JERSEY

REVERSE CLUTCH PULLEY MECHANISM

Application filed December 24, 1925. Serial No. 77,673.

My invention relates to a reverse clutch pulley mechanism, and more particularly to a reverse clutch pulley mechanism designed to be used in connection with engines employed in the oil fields during the drilling of and the operation of wells.

Reversing clutch pulley mechanisms employed in the oil fields are necessarily subjected to very rough usage and are exposed to severe weather conditions, consequently considerable trouble has heretofore been met with in using the said mechanisms due mainly to the fact that so many of the working parts of such mechanisms have been exposed and unprotected.

An object of the present invention is to provide a new and improved reverse clutch pulley mechanism, including a housing or casing, constituting the pulley member, in which the clutch mechanisms, clutch actuating means and other working parts are enclosed.

Further objects of my invention are to provide a construction embodying new and improved clutch mechanisms; new and improved means for operating the clutches; and a construction in which the principal working parts may be operated in an oil bath.

In the accompanying drawings, which illustrate an application of my invention;

Figure 1 is a horizontal sectional view of a reversing clutch pulley mechanism constructed in accordance with my invention;

Figure 2 a vertical sectional view, the section being taken on line II—II of Figure 1; and Figure 3 a similar view taken on line III—III of Figure 1.

Referring to the drawings, 1 designates an elongated hollow body, housing or casing constituting the pulley of the reversing clutch pulley mechanism. This body is designed to be connected with the drive shaft of an engine, not shown, by reversing clutch mechanism. A coupling member 2 keyed to a shaft 3 connects the shaft 3 to the drive shaft of the engine. The reversing clutch mechanism is arranged to selectively connect the hollow body 2 to the shaft 3 for rotation in one direction or the other.

A head 4 is fitted into and closes one end of the hollow body 1. Interposed between member 2 and the head 4 is a pulley wheel 5; this wheel is designed to be used for driving a pump, blower or other mechanism, not shown. Head 4 is formed with a hub portion 6 and is mounted on roller bearings 7 carried on shaft 3 between a thrust ring 8 and a portion of the coupling member 2. Thrust ring 8 is formed with a passage 9 to permit of the passage of oil to the bearing 7.

The clutch mechanism operable when it is desired to drive the pulley body 1, in the same direction of rotation as the engine shaft or other prime mover, includes a cage 10 keyed to shaft 3, friction shoes 11 carried on said cage, a clutch rim or member 12, having notched or toothed portions 13 and flange portions 14. Member 12 is securely attached to the head 4 of the hollow body 1. The shoes 11 are formed with toothed portions 15 adapted to engage the corresponding portions 13 on member 12. It will be noted that the toothed portions of the shoe 11 and the member 12 are formed concentric with and at right angles to the longitudinal axis of the drive shaft, thereby providing a friction slip construction as distinguished from a positive connection between the contacting surfaces on the said shoe and the toothed member 12.

On the reverse side of the clutch, similar clutch mechanism to that just described is employed, that is to say, a cage 10a friction shoes 11a and clutch member 12a. In this instance the clutch member 12a is secured to and adapted to rotate with a bevel gear wheel 16.

The clutch mechanism actuating means as illustrated and as preferred include a slidable member 17 mounted on and movable on shaft 3 and a system of links and connections between said memebr 17 and the respective clutch mechanisms. Member 17 is moved on the shaft 3 by means of an operating rod 18 and a cross-member 19 secured to the inner end of the rod 18. Rod 18 extends through a central longitudinally extending opening in the shaft 3 and shaft 3 is further formed with a slot 20 in which the cross-member 19 is adapted to slide; said member 19 being connected with rod 18 by a key 23.

Slidable member 17 is connected with the respective shoes 11 by means of links, 24, 25 and 26; the links 24 at one end are fulcrumed to ears 27 formed on member 17 by pins 28 and the other ends of the said links are connected with tension springs 29. One end of each of the links 26 is secured to a shoe by a pin 30 and each link 26 carries a pivotal pin 31 disposed in a slot 32 of each shoe and having its bearings in the cage 10. Member 17 is in turn connected with the respective shoes 11a on the reverse side of the structure by similar means including links 24a, 25a and 26a, ears 27a, pins 28a, springs 29a, pins 30a and 31a.

It will be understood that a movement of the member 17 in either direction is effective to move the link connections joining the clutch mechanisms whereby the said clutches are either engaged or disengaged. The pressure with which the shoes engage their respective members 12 and 12a is controlled by the springs 29 and 29a. When the springs are in their extended positions and the links 24 and 26 are substantially parallel and the links 25 at right angle with links 24 and 26, as shown at the left in Figure 1, the clutch mechanism is exerting the maximum frictional contact.

Surrounding the outer end of the shaft 3 is a nonrotatable spider 33. Spider 33 is provided with radial arms 34 and an elongated tubular portion 35. 36 designates an out-end bearing; this bearing supports the outer end of portion 35 and also forms an end closure for the rotatable body 1. The spider is secured to the stationary out-end bearing by a key 37.

Mounted on each of the arms 34 of the spider is a pinion 38; these pinions being arranged to engage the bevel gear 16 and a similar bevel gear wheel 39, the latter being secured to the outer end of the hollow body or casing 1 and operating on roller bearings 40. It will be understood that gear 39 rotates in an opposite direction from bevel gear 16.

By the construction of the elongated hollow body, constituting the pulley proper, and the provision of the closure means at the opposite ends of the body, I provide a structure forming a housing or casing for all the working parts of the reversing clutch pulley mechanism and a construction capable of maintaining an oil bath therein. In other words I provide a self contained unit in which all the movable parts are enclosed and may be operated in a bath of oil.

Operating rod 18 at its outer end is connected with a collar 40a, which collar in turn is connected with a link 41 fulcrumed at 42 to a projection 43 secured to the out-end bearing 36. The lower end of link 41 is joined to a horizontally movable member 44, said member 44 being intended to be moved by any suitable connecting means as 45, the latter being connected with means, not shown, leading from any desired point.

If desired a brake band may be placed on the hollow body in a groove 46 formed thereon.

In addition to the bearings 7 above described, I provide bearings 47 for the shaft 3.

As shown in the drawings, the clutch mechanism is positioned to rotate the pulley or housing in the same direction as the engine shaft or other prime mover to which it is coupled is rotated. To reverse the operation or the direction of rotation, slidable member 17 is moved outwardly on shaft 3; this outward movement will, through the link connections 24, 25, and 26, withdraw the toothed portions 15 from the corresponding toothed portions 13 of the members 12 thus freeing the shoes from their clutch rims. Simultaneously with the releasing of the members 11 and 12, the members 11a and 12a will be brought into frictional engagement; the link connections 24a—26a being forced by the outward movement of member 17 into locking position. While in this closed or locked position bevel gear 16, secured to clutch member 12a, will be rotated due to the fact that it is connected with the rotating shaft 3 through means including the cage 10a. Motion from gear 16 to bevel gear wheel 39 is transmitted through the pinions 38. Gear 39 will, of course, revolve in the opposite direction from gear 16 and shaft 3. Gear 39 being connected with the rotatable body 1 will revolve said body in a reverse direction from the direction of rotation of the shaft 3.

Further referring to Figure 1, it will be noted that I have shown a plurality of additional or auxiliary pulley members 1a and 1b; these members are each of greater diameter than pulley member 1 and are designed to be used in connection with my pulley mechanism when a pulley member of greater diameter than pulley 1 is desired.

The exterior of pulley member 1 is designed to receive the auxiliary pulley member 1a, said member 1a being secured to member 1 by keys 50 located near the inner end of the clutch mechanism and keys 51 near the outer end thereof.

Auxiliary pulley member 1b, as illustrated, is mounted on pulley member 1a and is secured thereto by keys 53 and 54.

By means of this construction a pulley of larger diameter than pulley 1 may be readily applied to the pulley mechanism without disturbing the working parts of the reverse clutch pulley mechanism.

What I claim is:

1. In combination, a driving shaft, clutch members in longitudinally spaced relation with respect thereto, an elongated pulley enclosing said members having its peripheral wall in relatively close and compact relation to said clutch members, one of said members being in fixed relation to the pulley, a reversing mechanism disposed at the outer side of the other member and connected to the pulley and carrying said other member, clutch shifting mechanism disposed between said members operable from outside the pulley, and means operable by the clutch shifting mechanism serving as the movable clutch means for said clutch members, said means having parts engageable with the inner wall of the pulley.

2. In combination, a driving shaft, an elongated hollow pulley coaxial therewith, a clutch mechanism within the pulley comprising a clutch member in fixed relation to the pulley adjacent one end of the latter and a movable clutch member connected to the shaft and cooperating with the fixed clutch member, reversing mechanism within the pulley connected to the latter adjacent its other end, a second clutch mechanism within the pulley, said clutch mechanisms being of substantially the same diameter as the interior of the pulley, said second clutch mechanism having a clutch member carried by part of the reversing mechanism and a movable clutch member connected to the shaft and coacting with the last mentioned clutch member, clutch shifting means substantially filling the space between the said clutch mechanisms and operable from the outside of the pulley including a slide on the driving shaft, and link mechanism having elements connected to the slide and to the movable clutch members, certain of said elements being engageable with the inner wall of the pulley as the clutch mechanisms are applied, and elements coacting with the said pulley, shaft and parts within the pulley adjacent its ends, to substantially close the pulley to enable it to retain an oil bath.

3. In combination, a driving shaft, clutch members in longitudinally spaced relation with respect thereto, an elongated pulley enclosing said members, one of said members being in fixed relation to the pulley, a reversing mechanism disposed at the outer side of the other member and connected to the pulley and carrying said other member, said clutch members being of substantially the same diameter as the space of the pulley, movable clutch means co-acting with the first mentioned clutch members, and clutch shifting means substantially filling the space within the pulley between the first mentioned clutch members, said clutch shifting means including a slide supported on the shaft operable from outside the pulley and also including link mechanism for operating said movable clutch means.

4. In combination, a driving shaft, an elongated hollow pulley coaxial therewith, a clutch mechanism within the pulley comprising a clutch member in fixed relation to the pulley and a movable clutch member connected to the shaft and cooperating with the fixed clutch member, reversing mechanism within the pulley connected to the latter, a second clutch mechanism within the pulley lying between the reversing mechanism and first mentioned clutch mechanism, said second clutch mechanism having a clutch member carried by part of the reversing mechanism and a movable clutch member connected to the shaft and coacting with the last mentioned clutch member, said clutch mechanisms being of substantially the same diameter as the interior of the pulley and longitudinally spaced apart, and a clutch shifting link means lying substantially between the said clutch mechanisms and having parts engageable with the inner wall of the pulley, said shifting means being operable from the outside of the pulley.

5. In combination, a driving shaft, an elongated hollow pulley coaxial therewith, a pair of annular friction clutch members of substantially the same diameter as the hollow of the pulley disposed therein, one of said clutch members being secured to the pulley and the other being operatively connected thereto through reverse bevel gearing, said clutch members being disposed coaxially with the pulley and spaced from each other, friction clutch shoes cooperating with said annular clutch members carried by the driving shaft, and operating mechanism for said clutch shoes including link connections lying within the pulley and occupying the space left therein by the longitudinal spacing of said annular clutch members, said link connections being provided with means for operating the same from outside of the pulley.

6. In combination, a driving shaft, an elongated hollow pulley coaxial therewith, a pair of annular friction clutch members of substantially the same diameter as the hollow of the pulley disposed therein, one of said clutch members being secured to the pulley and the other being operatively connected thereto through reverse bevel gearing, said clutch members being disposed coaxially with the pulley and spaced from each other, spaced cages secured to the driving shaft, friction clutch shoes cooperating with said annular clutch members carried by said cages, and operating mechanism for said clutch shoes including link connections lying within the pulley and occupying the space left therein by the longitudinal spacing of said annular clutch members and cages, said link connections being provided with means for operating the same from outside of the pulley.

In testimony whereof I affix my signature.

EDGAR E. GREVE.